United States Patent
Nistér et al.

(10) Patent No.: US 7,725,484 B2
(45) Date of Patent: May 25, 2010

(54) SCALABLE OBJECT RECOGNITION USING HIERARCHICAL QUANTIZATION WITH A VOCABULARY TREE

(75) Inventors: David Nistér, Lexington, KY (US); Henrik Stewénius, Lexington, KY (US)

(73) Assignee: University of Kentucky Research Foundation (UKRF), Lexington, KY (US)

( * ) Notice: Subject to any disclaimer, the term of this patent is extended or adjusted under 35 U.S.C. 154(b) by 193 days.

(21) Appl. No.: 11/602,419

(22) Filed: Nov. 20, 2006

(65) Prior Publication Data

US 2007/0214172 A1 Sep. 13, 2007

Related U.S. Application Data

(60) Provisional application No. 60/738,140, filed on Nov. 18, 2005.

(51) Int. Cl.
*G06F 17/30* (2006.01)
(52) U.S. Cl. .................................... 707/763; 707/706
(58) Field of Classification Search ................... None
See application file for complete search history.

(56) References Cited

U.S. PATENT DOCUMENTS

| | | | | |
|---|---|---|---|---|
| 5,519,789 | A * | 5/1996 | Etoh | 382/225 |
| 6,993,185 | B2 * | 1/2006 | Guo et al. | 382/176 |
| 2005/0225678 | A1 * | 10/2005 | Zisserman et al. | 348/571 |
| 2008/0082426 | A1 * | 4/2008 | Gokturk et al. | 705/27 |

OTHER PUBLICATIONS

J. Sivic and A. Zisserman, *Video Google: A Text Retrieval Approach to Object Matching in Video*, Proceedings of the Ninth IEEE ICCV (2003).
J. Sivic and A. Zisserman, *Video Data Mining Using Configurations of Viewpoint Invariant Regions*, Proceedings of the IEEE Conference on Computer Vision and Pattern Recognition, Washington, D.C. (2004).
J. Matas, O. Chum, M. Urban, T. Pajdila, "Robust Wide Baseline Stereo from Maximally Stable Extremal Regions," In BMVC, vol. 1, pp. 384-393 (2002).
David Lowe, "Distinctive Image Features from Scale-Invariant Keypoints," IJCV 60(2):91-110 (Jan. 5, 2004).
K. Grauman and T. Darrell, The Pyramid Match Kernel: "Discriminative Classification with Sets of Image Features," In Proceedings of the IEEE International Conference on Computer Vision, China (Oct. 2005).
H. Eidenberger, "A new perspective on visual information retrieval," Vienna University of Technology (2004).

* cited by examiner

*Primary Examiner*—Baoquoc N To
(74) *Attorney, Agent, or Firm*—Macheledt Bales LLP

(57) ABSTRACT

An image retrieval technique employing a novel hierarchical feature/descriptor vector quantizer tool—'vocabulary tree', of sorts comprising hierarchically organized sets of feature vectors—that effectively partitions feature space in a hierarchical manner, creating a quantized space that is mapped to integer encoding. The computerized implementation of the new technique(s) employs subroutine components, such as: A trainer component of the tool generates a hierarchical quantizer, Q, for application/use in novel image-insertion and image-query stages. The hierarchical quantizer, Q, tool is generated by running k-means on the feature (a/k/a descriptor) space, recursively, on each of a plurality of nodes of a resulting quantization level to 'split' each node of each resulting quantization level. Preferably, training of the hierarchical quantizer, Q, is performed in an 'offline' fashion.

16 Claims, 13 Drawing Sheets

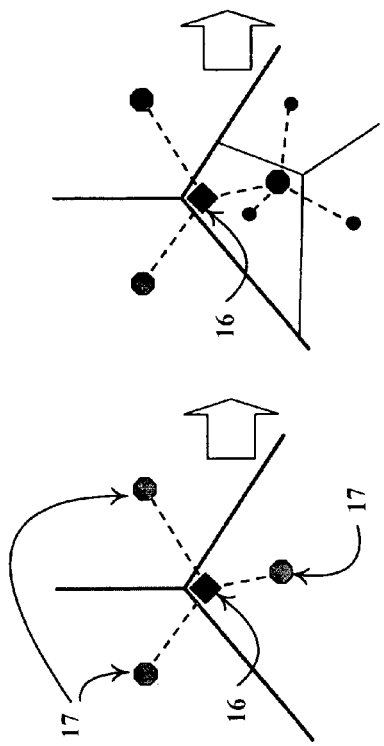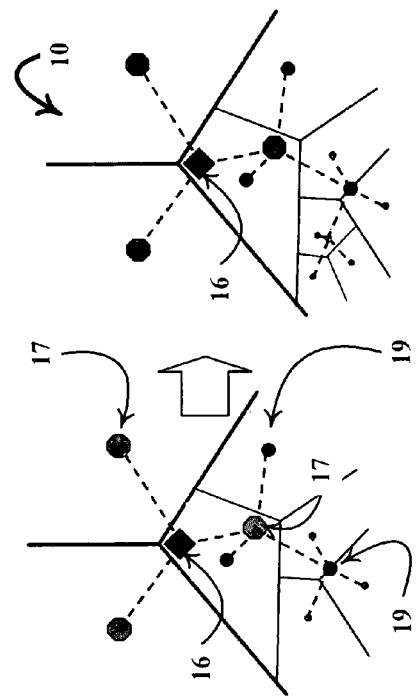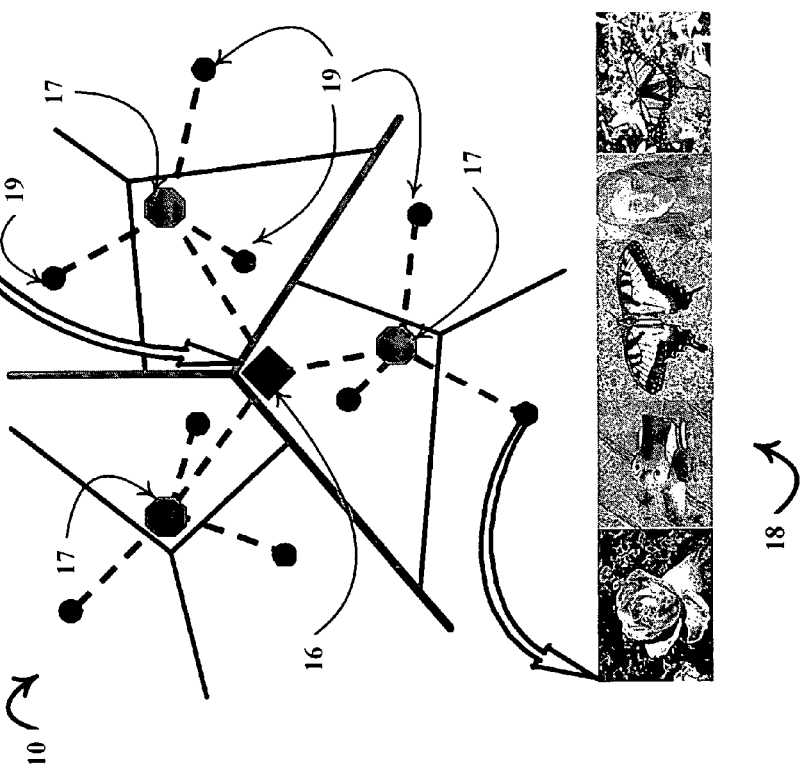

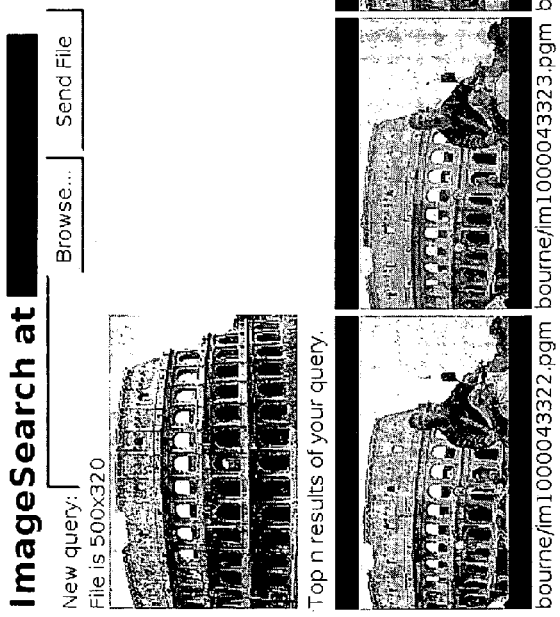
FIG. 11 top
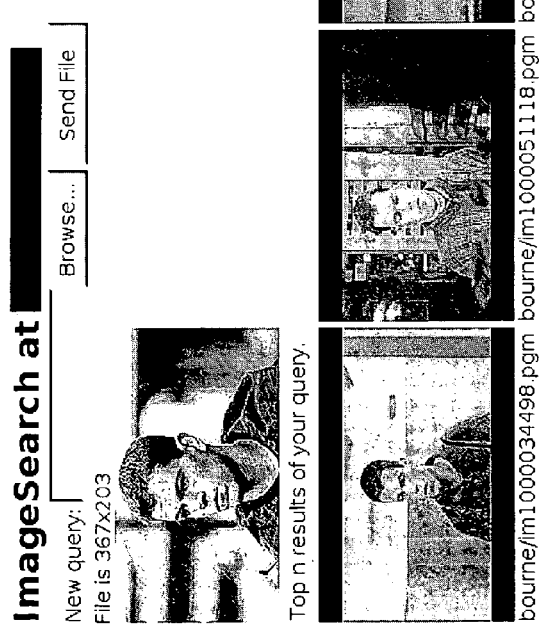
FIG. 11 bottom

TRAINER: Train Hierarchical quantizer ("quantizer is a computation")

<u>NOTE</u>: Once "trained" in this fashion, the Hierarchical quantizer, Q, is effectively a hierarchy of smaller quantizers, q, (*i.e.*, hierarchically organized sets of feature vectors)

Input: Integers k,d
  Large set of feature vectors of length L
  ("feature vector(s)" as used throughout, are considered 'member(s)' of continuous "feature space").

Output: Hierarchical Quantizer, Q defined by:
  $Q = \{k, d, \{Q_{ij}\}\}$

Load All data into $A_{00}$
for i=0 to (d-1)
  for j=0 to ($k^i$-1)
    Train a k-means clusterer $Q_{ij}$ with k centers using the data in $A_{ij}$
    Use $Q_{ij}$ to divide $A_{ij}$ into k sets, call these sets $A_{(i+1)(kj)} \ldots A_{(i+1)(kj+k-1)}$
  end
end return $\{k, d, \{Q_{ij}\}\}$ TRAINER (slide 2)

FIG. 15

Generic application of Hierarchical Quantizer, Q
{for either ONLINE INSERT Image or QUERY Image stage}

*115/125 pseudo-code*

> This subroutine is used for hierarchical quantizer, Q, to quantize feature vectors of Insert Images and Query Images to thereafter represent each respective feature vector as a list of visual words/integers.

Input: Hierarchical quantizer {{k,d,{$Q_{ij}$}}}
Data feature vector, x (to be quantized)

Output: Integer in the range 0 to ($k^d$-1).
{These are the discrete quantities/integers referred to as '*visual words*.'} n=0
for i=0 to (d-1)
   temp = index of closest cluster center in $Q_{ij}$ to x
   n = temp + k*n
end
return n

*115/125 schematic*

Applying the quantizer: Use the first 'smaller' quantizer to determine a branch
At subsequent levels, use smaller quantizer (node) corresponding to the choices at earlier level(s):

$A_{00}$ { Level "0"}
$A_{11} \ldots A_{1(k-1)}$ { Level "1"}
$A_{10}$
repeat at every Level "1" thru > the last Level "d-1"

> To determine a branch: Compute the distance from feature vector x (one from the set for image being queried?) to all vector/lists $y_i$, return $i$ where smallest distance was found.

APPLY QUANTIZER ONLINE (slide 3)

FIG. 16

Transform image to a set of feature vectors (as members of continuous feature space)
Input: **Image
Output: feature vectors and total number of such vectors 0) Load **Image

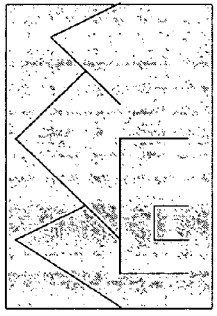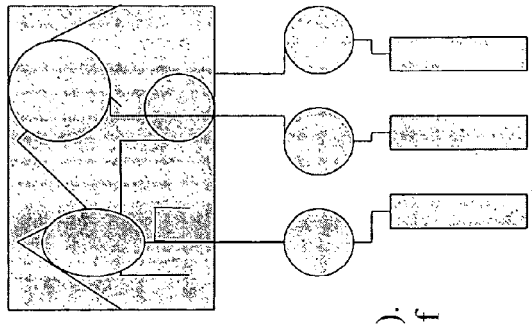

1) Use an interest point detector, for example MSER to detect regions (or, 'features' of interest)

2) Extract the regions/features of interest

3) Compute a descriptor/feature vector for each region/feature (for example using SIFT). {each **Image is now represented by a set of feature vectors.}

102

Conventional TRANSFORMATION of Image >set of feature vectors in continuous feature space (slide 4)

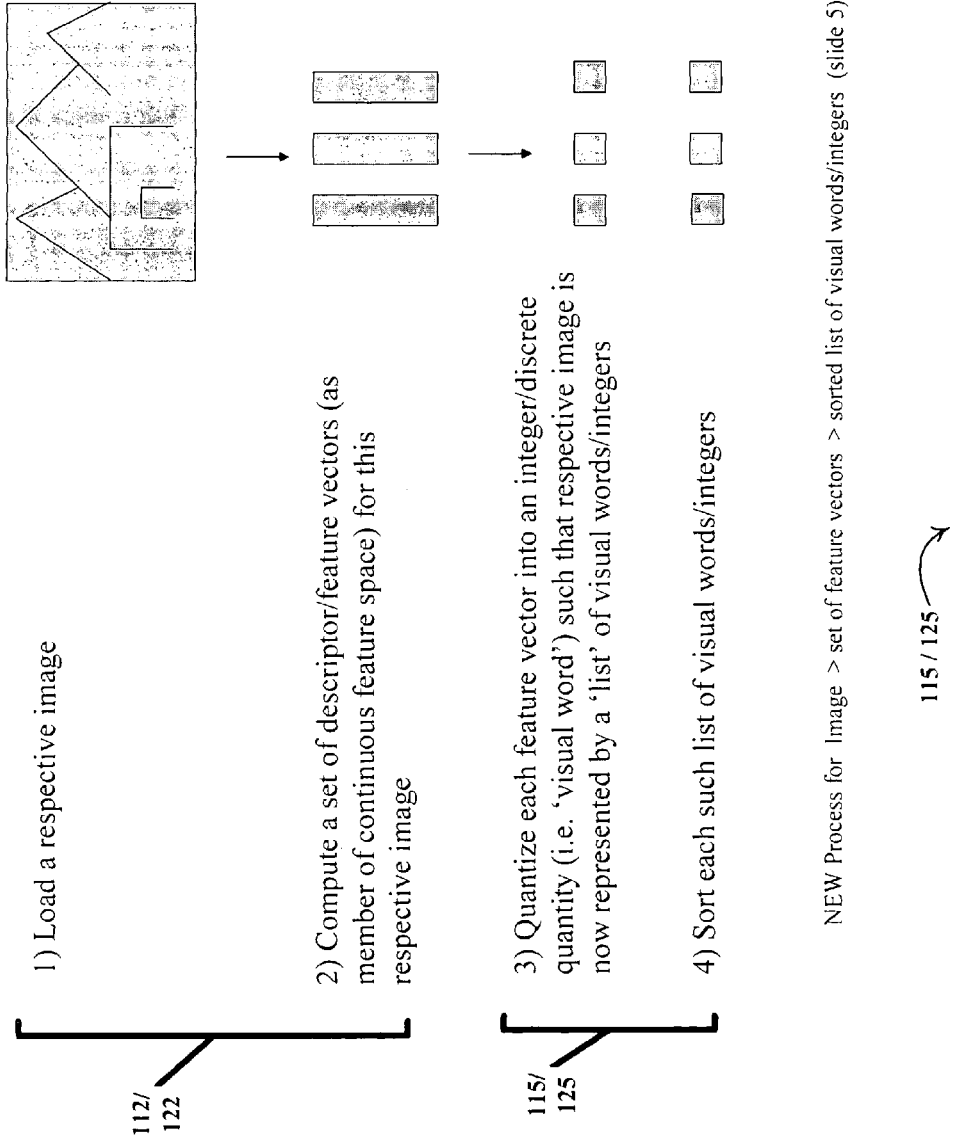

FIG. 18

Database insertion pipeline

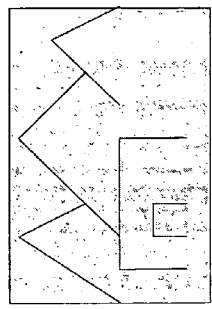

0) Load a query image, associate it with the next free id-number

1) Quantize each feature vector into a visual word/integer such that the query image is now represented by a 'list' of visual words/integers. Sort each such list of visual words/integers.

2) For each visual word insert the id-number to the inverted file corresponding to each visual word/integer 3) For each visual word. Update the total counts of inserted elements and counts of unique elements accordingly at all levels of the tree. This means for each level 0 to d update the counter with index floor(w/(k^(d-level))).

set of feature vectors > visual words/integers (slide 6)

SCALABLE OBJECT RECOGNITION USING HIERARCHICAL QUANTIZATION WITH A VOCABULARY TREE

This application claims the benefit of U.S. provisional patent app. No. 60/738,140 filed 18 Nov. 2005 for the applicants on behalf of the assignee hereof.

BACKGROUND OF THE INVENTION

Field of the Invention

In general, the present invention relates to computer vision techniques for object recognition and digital image retrieval using accessible databases of a large number of images—to provide a means of lookup and retrieval of 'visual word' matches within one or more of the database(s). The problem of searching for digital images in large databases is not new. As explained in applicants' Provisional Patent Application No. 60/738,140, fully incorporated herein by reference for its technical background discussion, a new image retrieval technique has been devised. More particularly, the invention is directed to an improved image retrieval technique employing a novel hierarchical feature/descriptor vector quantizer—referred to as a 'vocabulary tree' comprising hierarchically organized sets of feature vectors—that effectively partitions feature space in a hierarchical manner, creating a quantized space that is mapped to integer encoding.

The computerized implementation of the new technique(s) to which the instant application is directed, employs core, as well as further distinguishing subroutine components, including: A trainer component for generating a hierarchical quantizer, Q, for application/use in novel image-insertion and image-query stages. The hierarchical quantizer, Q, is generated by running k-means on the feature (a/k/a descriptor) space, recursively, on each of a plurality of nodes of a resulting quantization level to 'split' each node of each resulting quantization level. Preferably, training of the hierarchical quantizer, Q, is performed in an 'offline' fashion employing suitable computing capability-meaning prior-in-time so as to generate the hierarchical quantizer component for subsequent application/use in connection with the novel image-insertion and image-query components. The offline training may be performed on the same computer, or performed using a 'remote' (i.e., physically or logically separate) computing device, as that employed for performing the unique image-insertion and image-query stages. Indeed, as one will appreciate in the context of using the novel hierarchical quantizer, Q, in connection with an INTERNET image query via the world-wide-web (www) to search a collection of remote databases for an image match: A client computer will be remote from—while preferably in communication with—a host computing device that performs an image-query or an image-insertion into the database, utilizing the novel hierarchical quantizer, Q, component. Furthermore, the offline training of the novel hierarchical quantizer, Q, will likely have been performed on a computing device separate from any of those used to perform an image-query or an image-insertion into the database.

An exemplary model of each component is detailed herein in connection with automatic, computerized retrieval of images. The models have been provided for purposes of understanding the unique hierarchical quantizer, Q, as a tool for efficient search/query and matching against digital information stored in a database (or collection of databases) representing visual (initially non-discrete) information/data. It is contemplated that the instant invention has application in query & matching-up of a wide variety of different types of visual information, including still images (as showcased herein), video, television, and other information that exists an initially non-discrete/logically continuous form, against the contents of a database(s) of like discrete information/data for which a match is attainable.

General Discussion of Terms Used Herein, Provided by Way of Reference, Only:

I. Visual Information Retrieval (VIR) is an area of computer vision object recognition, and includes the process of searching for similar images against those stored in a database.

II. An image represents an object. A digital image is represented as a matrix of pixel values. A high resolution image is such a matrix that includes more information about the object it represents; thus, takes up more memory and storage space. Searching and retrieving images from a large database is a memory- and processor-intensive process: Using currently-available, conventional techniques, it can take a great deal of time to search and retrieve ('match-up') a query image (an image in question) with the many database images represented and stored in the database.

III. According to the invention, feature regions—or regions of interest—are extracted from an image. For each such extracted feature region, a feature vector (also referred to as descriptor vector, or more-simply, vector) is computed for later computer manipulation. Feature vectors exist as member of continuous feature space. While vector/feature space may have an arbitrary number of dimensions, for consistency it is most-logical to define a given feature space to have the same number of dimensions as the feature vectors to which it references—as these terms are interrelated.

IV. Vector elements make up feature vectors; each vector element represent an encoding, of sorts.

V. The quantization of a feature vector produces visual words. That is to say, quantization operates on a feature vector and reduces (or quantizes) it into a discrete value (i.e., a numerical quantity) generally in the form of an integer. A conventional form of quantization of feature vectors into clusters, each of which is defined as a visual word, is described at length by J. Sivic and A. Zisserman, *Video Google: A Text Retrieval Approach to Object Matching in Video*, Proceedings of the Ninth IEEE ICCV (2003). They carry out a feature vector quantization by a single, K-means clustering. The text image retrieval approach presented by Sivic and Zisserman (2003) is very cumbersome.

VI. J. Matas, O. Chum, M. Urban, T. Pajdila, "Robust Wide Baseline Stereo from Maximally Stable Extremal Regions," *In BMVC*, Vol. 1, pp. 384-393 (2002), reference use of maximally stable extremal regions (MSER) in connection with their study of the problem of establishing correspondences between a pair of images taken from different viewpoints. MSER is an interest point detector used to find a feature region of interest around distinctive detected points. A feature vector is then computed for each feature region of interest identified within the image using a suitable re-sampling technique (e.g., see VII.).

VII. Scale Invariant Feature Transform (SIFT) as explained by David Lowe, "Distinctive Image Features from Scale-Invariant Keypoints," *IJCV* 60(2):91-110 (Jan. 5, 2004), is a technique employed in connection with finding feature regions of interest as well as computing respective feature vectors (collectively referred to as 'extracting features from images'). SIFT is applied, herein, for purposes of computing respective feature vectors.

VIII. A technique coined a pyramid match kernel function is described by K. Grauman and T. Darrell, The Pyramid Match Kernel: "Discriminative Classification with Sets of Image Features," *In Proceedings of the IEEE International Conference on Computer Vision*, China (October 2005).

IX. Some history of the magnitude of the scope of VIR has been reviewed by H. Eidenberger, "A new perspective on visual information retrieval," Vienna University of Technology (2004).

X. Digital computers. A processor is the set of logic devices/circuitry that responds to and processes instructions to drive a computerized device. The central processing unit (CPU) is considered the computing part of a digital or other type of computerized system. Often referred to simply as a processor, a CPU is made up of the control unit, program sequencer, and an arithmetic logic unit (ALU)—a high-speed circuit that does calculating and comparing. Numbers are transferred from memory into the ALU for calculation, and the results are sent back into memory. Alphanumeric data is sent from memory into the ALU for comparing. The CPUs of a computer may be contained on a single 'chip', often referred to as microprocessors because of their tiny physical size. As is well known, the basic elements of a simple computer include a CPU, clock and main memory; whereas a complete computer system requires the addition of control units, input, output and storage devices, as well as an operating system. The tiny devices referred to as 'microprocessors' typically contain the processing components of a CPU as integrated circuitry, along with associated bus interface. A microcontroller typically incorporates one or more microprocessor, memory, and I/O circuits as an integrated circuit (IC). Computer instruction(s) are used to trigger computations carried out by the CPU. Frequency counters are digital indicating meters for measurement and display of input signals in the form of square wave(s) and pulse(s). Binary counters are digital circuits that have a clock input and one or more count output; the count output may give the number of clock cycles for a clock input, or may be employed to count pulses for an input digital waveform.

XI. Computer Memory and Computer Readable Storage. While the word 'memory' has historically referred to that which is stored temporarily, with storage traditionally used to refer to a semi-permanent or permanent holding place for digital data—such as that entered by a user for holding long term—more-recently, the definitions of these terms have blurred. A non-exhaustive listing of well known computer readable storage device technologies are categorized here for reference: (1) magnetic tape technologies; (2) magnetic disk technologies include floppy disk/diskettes, fixed hard disks (often in desktops, laptops, workstations, etc.), (3) solid-state disk (SSD) technology including DRAM and 'flash memory'; and (4) optical disk technology, including magneto-optical disks, PD, CD-ROM, CD-R, CD-RW, DVD-ROM, DVD-R, DVD-RAM, WORM, OROM, holographic, solid state optical disk technology, and so on.

SUMMARY OF THE INVENTION

It is a primary object of this computer-related invention to provide a quantization 'tool' for use in a computerized image retrieval system. The quantization tool is comprised of hierarchically quantized data representing a plurality of images organized using a unique method. The unique method, for organizing includes the steps of: (a) computing a plurality of sets of feature vectors, each set associated with a particular image wherein each feature vector within a set represents a detected feature region of interest from a particular associated image; (b) quantizing each feature vector within each set, producing a list of numerical quantities associated with each of the sets; and (c) applying a k-means cluster operation, recursively, to the lists to hierarchically organize the sets of feature vector information. Preferably the k-means cluster operation is performed at least thrice.

A database is generated using the quantization tool. This database will be composed of the hierarchically organized sets of feature vectors representing the plurality of images. When a new image is to be inserted into the database, a unique process is used. This image-insertion process has the steps of: (a) first, computing a new image set of feature vectors for the new image; and (b) quantizing each of the feature vectors for the new image to create a new image list of numerical quantities associated with the new image. When an image-query is to, be performed against the database to find a closest match, a unique process is used. This image-query process has the steps of: (a) first, computing a query image set of feature vector information for the query image; and (b) quantizing each of the feature vectors for the query image to create a query image list of numerical quantities associated with the query image, to find a closest match within the database.

In another characterization of the invention, the invention includes a quantization tool for use in generating a database comprising hierarchically organized sets of feature vector information representing a plurality of images. The sets of feature vector information having been organized using a unique method comprising the steps of: (a) computing a plurality of sets of feature vectors, each set associated with a particular image wherein each feature vector within a set represents a detected feature region of interest from a particular associated image; (b) quantizing each feature vector of each of the sets, producing a list of numerical quantities associated with each respective set; and (c) applying a k-means cluster operation, recursively, to the lists to hierarchically organize the sets of feature vectors. In other characterizations, the invention includes: computer executable program code on a computer readable storage medium for hierarchically quantizing data representing a plurality of images; and computer executable program code on a computer readable storage medium for use in generating a database comprising hierarchically organized sets of feature vector information representing a plurality of images. As one will appreciate, throughout, the term 'feature vector information' is used interchangeably with the concept of 'feature vector' as contemplated hereby.

Certain of the unique components, and further unique combinations thereof—as supported and contemplated in the instant technical disclosure—provide one or more of a variety of advantages, as explained throughout. One will appreciate the distinguishable nature of the novel hierarchical feature vector quantizer component, and associated techniques employing same for image-insertion and image-query described herein from earlier attempts by others, one or more of which may include: ease of system integration; component application versatility; ability to insert additional images into the database(s) on-the-fly; reliable investigation and query of images on-demand without disruption of the database undergoing investigation; and ease of integration with computer object recognition systems and equipment currently in use.

BRIEF DESCRIPTION OF THE DRAWINGS

FIG. 1 schematically represents a vocabulary tree 10 with a branch-factor, k=3 (k is an indicator of how fast the tree branches) with only two levels of branches having been computed for simplicity of illustration: This is an illustration of process to apply the unique trained hierarchical quantizer, Q, of the invention to an image-query 120 (FIG. 12).

FIGS. 2a-2d schematically illustrate the process of building a vocabulary tree (also referred to as a hierarchical quantizer, Q) at four (recursive) levels wherein a k-means cluster is run, starting with FIG. 2a, graphically depicting the results of quantizing a feature vector into clusters 17.

FIG. 11top depicts an image (individual digital picture) undergoing a query (120, FIG. 12).

FIG. 11bottom depicts results from searching the image of a movie star face using a database size of 300K frames. Both searches were performed with images separate from the movies.

FIG. 14 is a functional diagram schematically detailing, using pseudo code, trainer component 105, the outcome of which is a trained vocabulary tree/hierarchical vector quantizer (also represented elsewhere in FIG. 2d and at 30 in FIG. 3).

FIG. 15 is a functional diagram schematically detailing, using pseudo code and by way of schematic (see also FIG. 12 at 115, 125) the application of a trained hierarchical quantizer, Q, as employed in either the image-insert 110 or image-query 120 component.

FIG. 16 is a functional diagram schematically detailing a conventional transformation of an Image into a set of feature vectors—four of such a sets represented in FIG. 12 at 102 (Image 01, Image 02, Image 03, **Image 04)—for quantizing according to the invention.

FIG. 17 is a simplification, in flow diagram format, of the process to quantize feature vectors of all image, starting with the conventional transformation of an **Image (see also FIG. 16) into a set of feature vectors 112, 122 (see also FIG. 12), through hierarchical sorting/organization.

FIG. 18 is a simplification, in flow diagram format, of process 220 to quantize feature vectors of an image during an image-query (expansion of elements in the image-query 120, FIG. 12): a conventional transformation of an **Image (see, also, FIG. 16) into a set of feature vectors is performed, through hierarchical sorting/organization thereof.

DETAILED DESCRIPTION OF EMBODIMENTS REPRESENTED BY THE DRAWINGS

Reference will be made back-and-forth to the figures so as to better appreciate the unique components/subcomponents, and associated method of the invention depicted throughout—as well as to incorporate examples employing the method of the invention, in image retrieval platforms. While examples provided herein showcase the use of the hierarchical quantizer, Q, as produced after training within the trainer component, as well as in an image-insertion component and an image-query component, other information retrieval techniques that benefit from useful matches of hierarchically organized discrete information/data are contemplated hereby.

Figure 12:
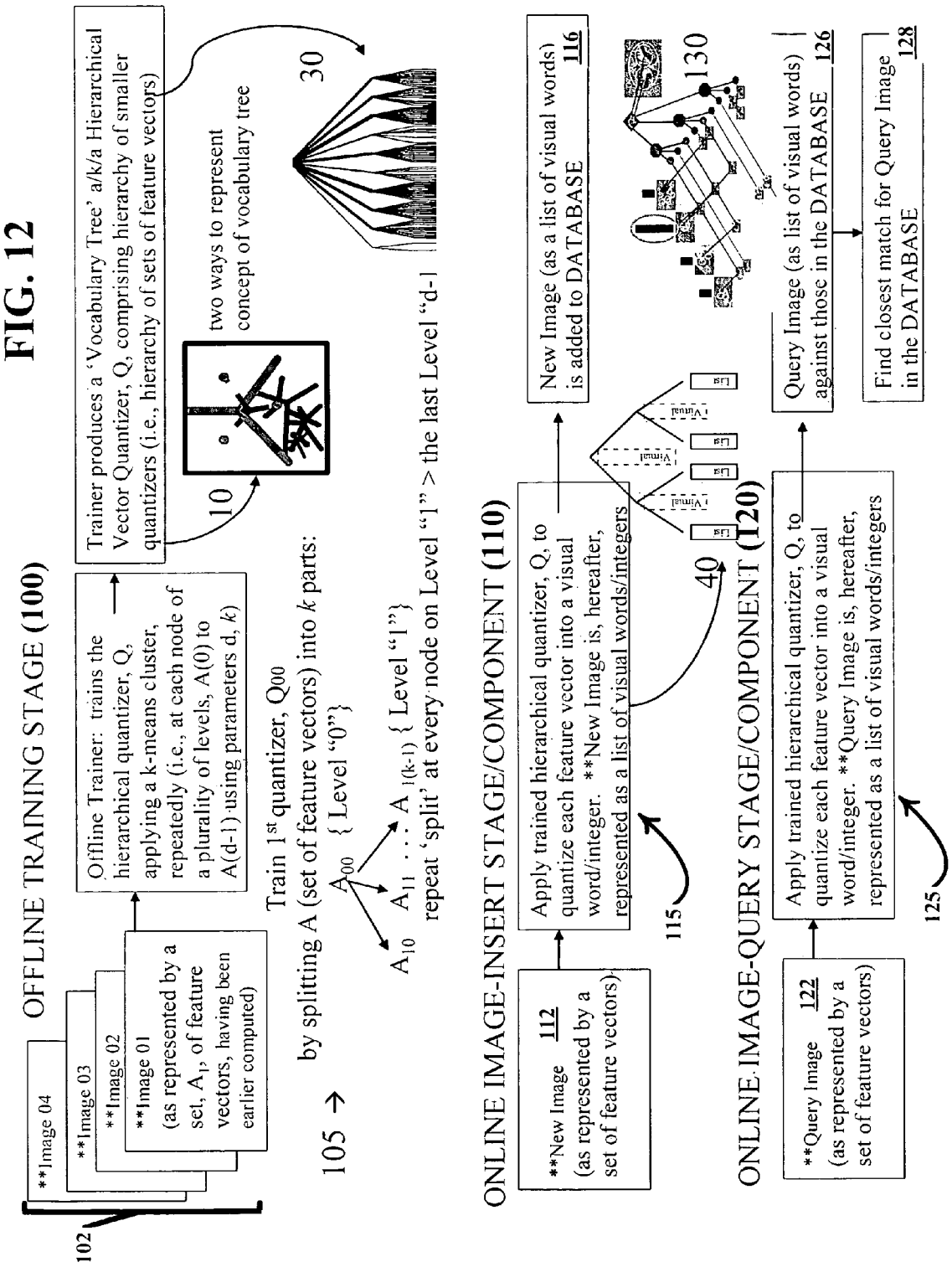
FIG. 12 is a high-level functional diagram schematically representing use of the hierarchical quantizer, Q, as produced after training within the trainer component 100, and as applied within a novel image-insertion component 110 and novel image-query component 120.
Figure 13:
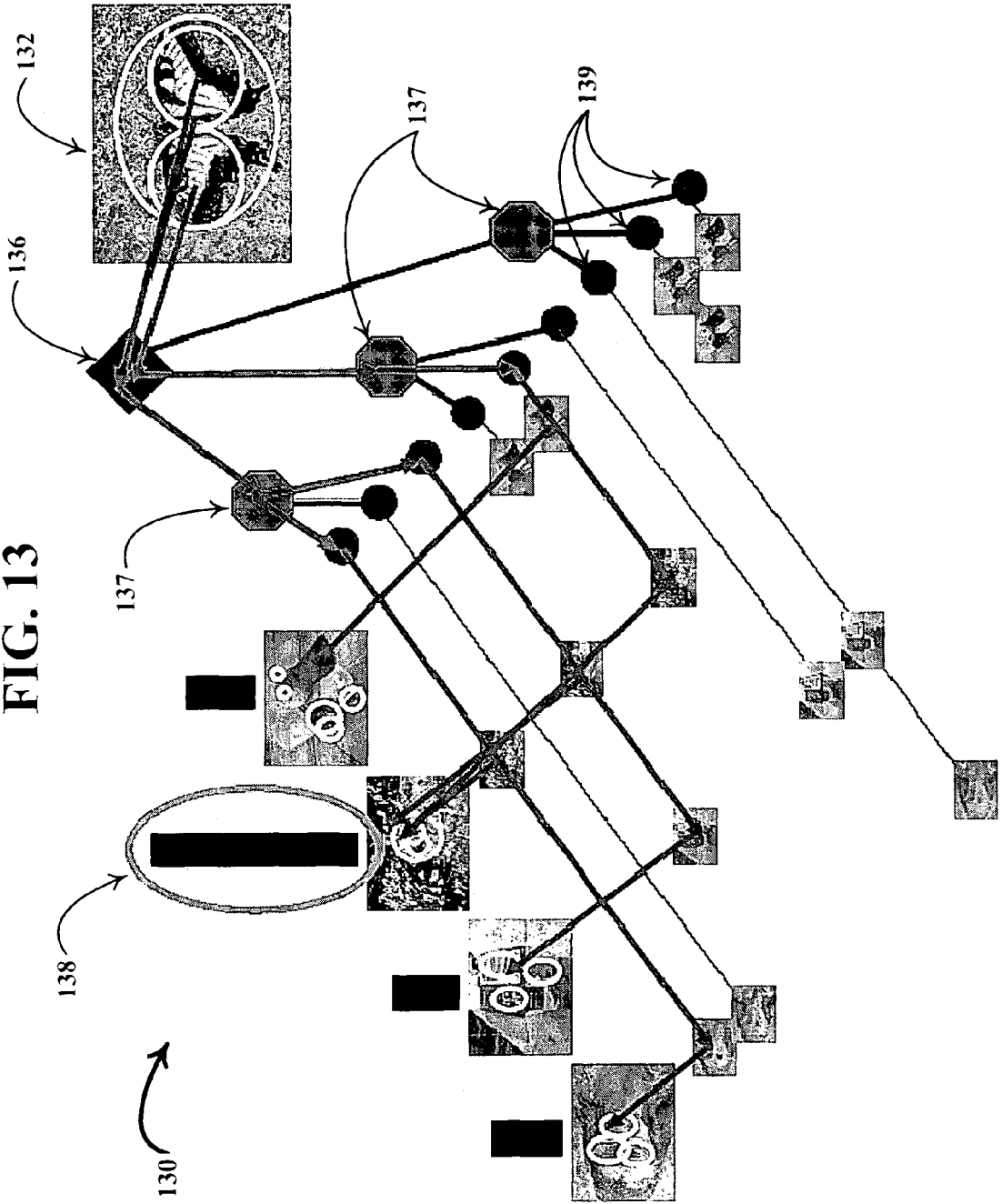
FIG. 13 schematically represents of a vocabulary tree 130 as a hierarchy of smaller quantizers as used during an image-query (see, also, FIG. 12 at 120).

FIG. 1 schematically represents a vocabulary tree 10 with a branch-factor, k=3 (k is an indicator of how fast the tree branches) and only two levels of branches having been computed for simplicity of illustration. One can appreciate how complex! this graphic, would become were it to depict more levels (see, also, FIG. 3). To follow the process for an initial build of a vocabulary tree such as that represented in FIG. 2d (i.e., the training of a hierarchical quantizer, Q, to ready it for employment in an image-insert component and an image-query component) turn, also, to FIG. 12 at 100 "Offline Training Stage." The vocabulary tree at 10 in FIG. 1 and at 13 at 130 are shown 'populated' with regions of interest of an example query image 12, 132—an associated feature vector (16, 136) of which was quantized around centers 17, 137 as explained in greater detail below. Thus, FIGS. 1 and 13 are graphic depictions of that which results from application of the unique trained hierarchical quantizer, Q, within an image-query component 120 (FIG. 12).

Refer, once again, back to FIG. 1: To begin, a large number of elliptical regions, such as that labeled 14, are extracted from the image 12 and warped to canonical positions. A feature/descriptor vector is computed for each region, 14 (sub-process detailed in FIG. 16, results at 102). The descriptor vector is then hierarchically quantized by the vocabulary tree 10 (see, also, FIG. 2d and FIG. 13 at 130). In the first quantization layer/level (i.e., during the first application of k-means, see also FIG. 15 labeled 115/125), the descriptor vector is, assigned 16 to the closest of the octagonal centers 17 (also labeled in FIG. 13 at 137). In the second layer/level (i.e., during a subsequent, or next, application of k-means, see also FIG. 15 labeled 115/125), the descriptor vector is assigned to the closest of the three circular descendants 19 (also labeled in FIG. 13 at 139) of a respective octagonal center 17. With each node in the vocabulary tree 10 (FIG. 13 at 130) there is an associated inverted file with references to any database images (a collection thereof, labeled 18) containing an instance of that node. The images in the database (including those at 18) had been inserted and scored, offline (likely earlier-in-time, even if updated with new images, moments before), hierarchically using the inverted files at multiple levels of the vocabulary tree (see FIG. 12, Offline Training Stage at 100).

FIGS. 2a-2d schematically illustrate the process of building a vocabulary tree (also referred to as a hierarchical quantizer, Q) at four (recursive) levels wherein a k-means cluster is run, starting with FIG. 2a, graphically depicting the results of quantizing a feature vector into clusters 17 (the feature vector could represent any region of interest of a sample image, for example, region 14 of image 12. FIG. 1). Referring also to FIG. 12 Offline Training Stage 100—with particular attention paid to the collection of steps labeled 105—the hierarchical quantization is defined at each level by k centers (in this case k=3) and their associated Voronoi regions. FIG. 2b graphically depicts a subsequent, i.e., next-level, k-means computation: The concept of 'branching' from one of the three FIG. 2a clusters 17 is shown. Likewise, FIGS. 2c and 2d illustrate the concept of next-levels of branching for subsequent (recursive) computations using a k-means clusterer to create the tree.

Figure 3:
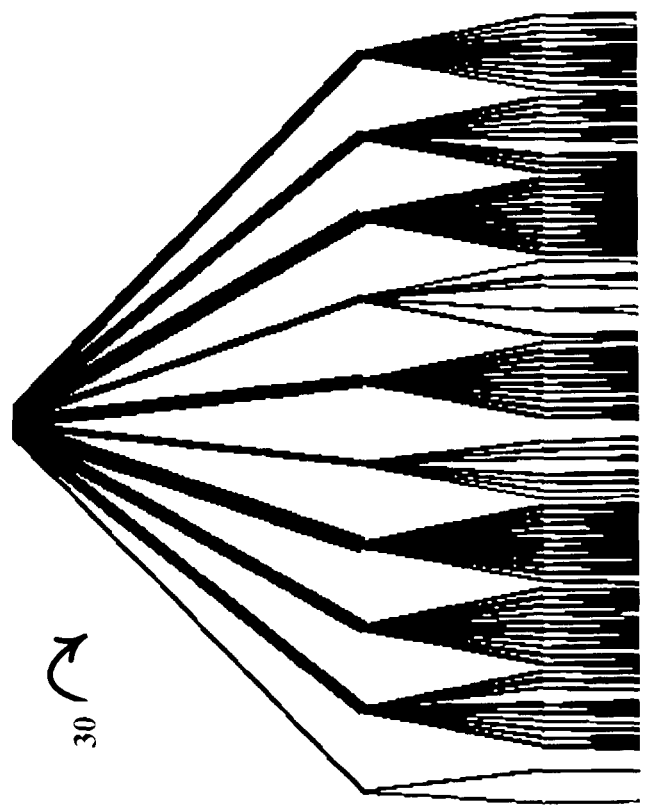
FIG. 3 is yet another way to graphically depict three levels of a vocabulary tree 30, this one with a branch factor k=10 populated to represent an image with 400 features.

FIG. 3 is yet another way to graphically depict three levels of a vocabulary tree 30, this one with a branch factor k=10 populated to represent an image with 400 features.

Figure 4:
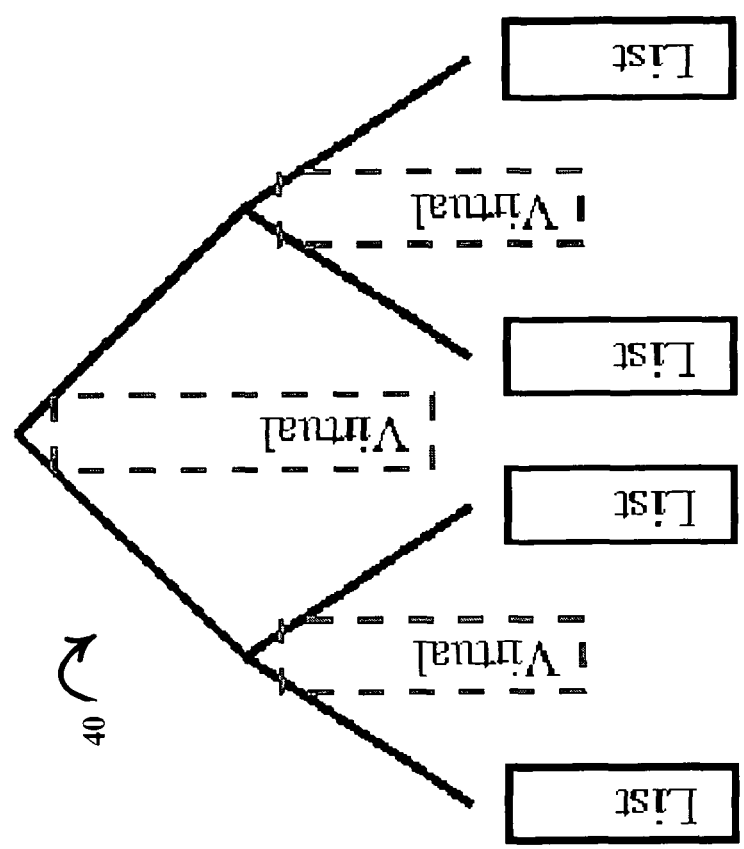
FIG. 4 is a schematic depiction of a database structure 40 shown with two levels and branch factor k=2.

FIG. 4 is a schematic of database structure 40 shown with two levels and branch factor k=2. Leaf nodes (very bottom) have explicit inverted files and the inner nodes (middle of the diagram) have virtual inverted files that are computed as the concatenation of the inverted files of the leaf nodes.

Figure 5:
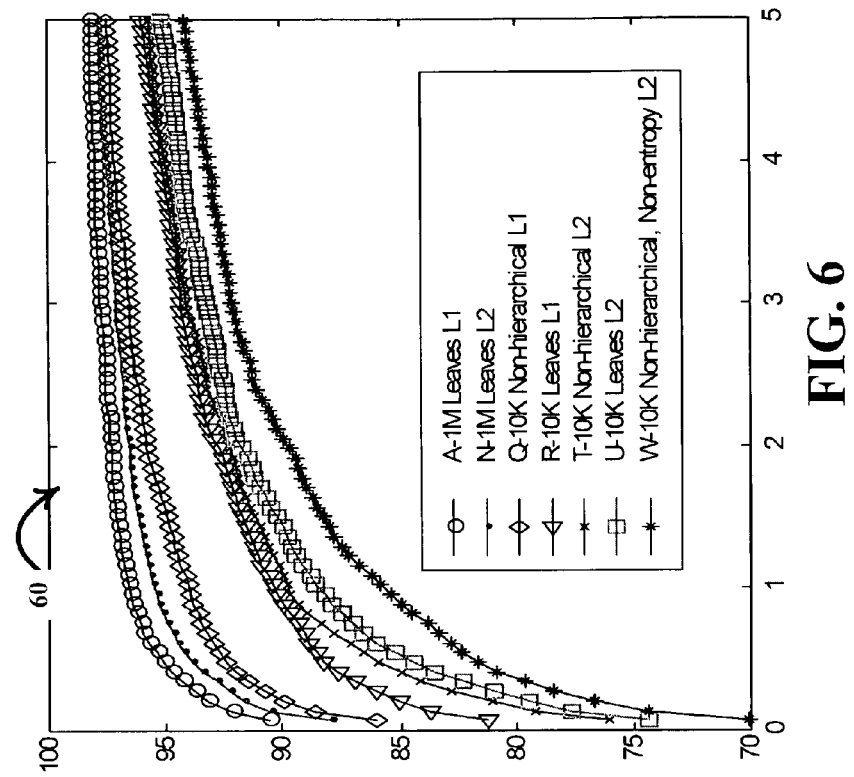
FIG. 5 depicts results from an evaluation of the retrieval performance using a large ground truth database (6376 images) with groups 54 of four images known to be taken of the same object, but under different conditions.

FIG. 5 depicts results from an evaluation of the retrieval performance using a large ground truth database (6376 images) with groups 54 of four images known to be taken of the same object, but under different conditions. Each image in turn is used as query image (for example, the first being the shoe 52), and the three remaining images from its group should ideally be at the top of the query result. In order to compare against less efficient non-hierarchical schemes we also use a subset of the database consisting of around 1400 images.

Figure 6:
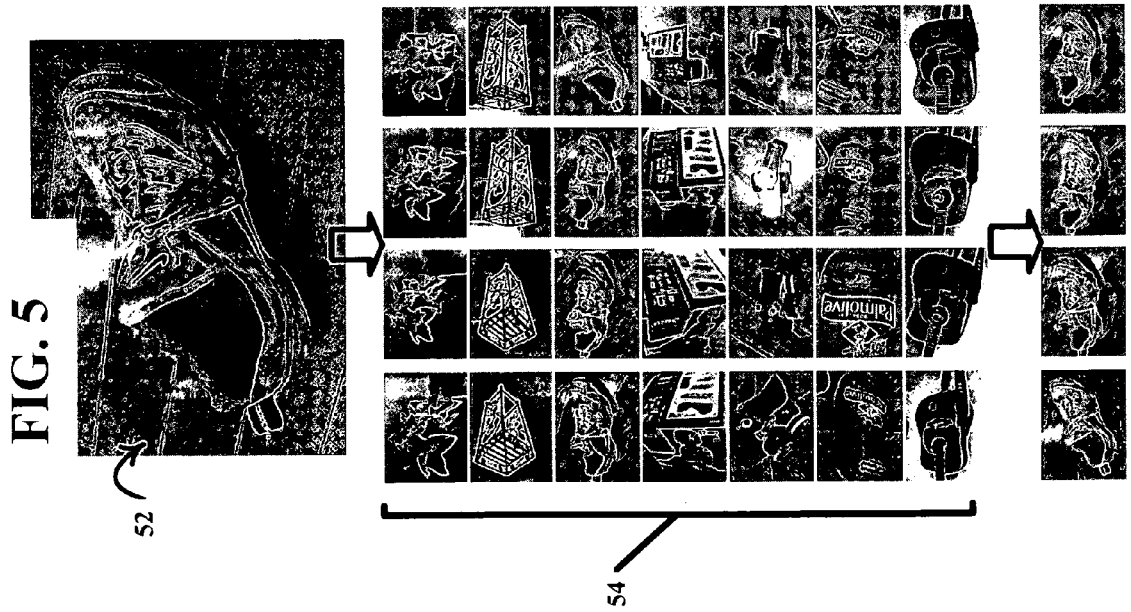
FIG. 6 graphically depicts results (several curves in graph 60) showing percentage (y-axis) of the ground truth query images that make it into the top x percent (x-axis) frames of the query for a 1400 image database.

FIG. 6 graphically depicts results (several curves in graph 60) showing percentage (y-axis) of the ground truth query images that make it into the top x percent (x-axis) frames of the query for a 1400 image database. The curves are shown up to 5% of the database size. As discussed in the text, it is crucial for scalable retrieval that the correct images from the database make it to the very top of the query, since verification is feasible only for a tiny fraction of the database when the database grows large. Here, of greatest interest is where the curves meet the y-axis. Certain conclusions drawn from results: A larger vocabulary improves retrieval performance. $L_1$-norm gives better retrieval performance than $L_2$-norm. Entropy weighting is of some import, at least for smaller vocabularies.

Figure 7:
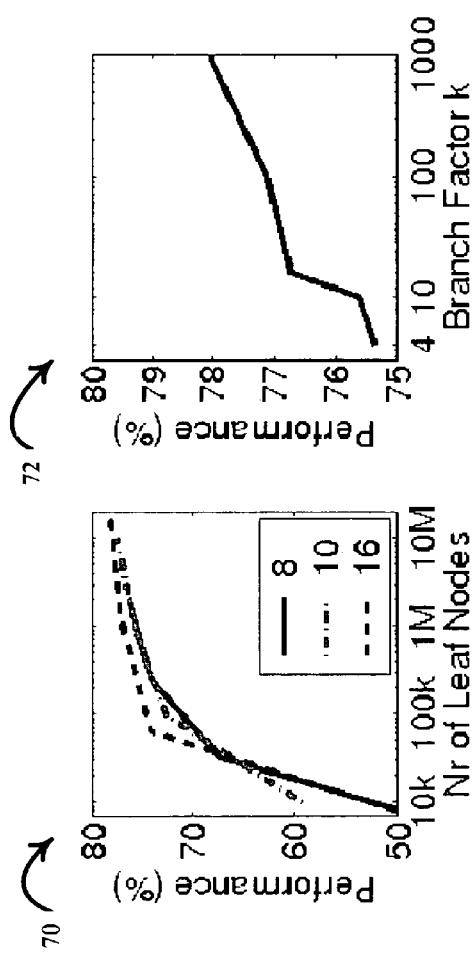
FIG. 7 graphically depicts results from vocabulary tree shapes tested on the 6376 ground truth image set. Left (70) represents performance vs number of leaf nodes with branch factor k=8, 10 and 16. Right (72) represents performance vs k for 1 M leaf nodes.

FIG. 7 graphically depicts results from vocabulary tree shapes tested on the 6376 ground truth image set. Left (70) represents performance vs number of leaf nodes with branch factor k=8, 10 and 16. Right (72) represents performance vs k for 1 M leaf nodes. Performance increases with number of leaf nodes; with some performance increase seen with branch factor, but not as dramatically.

Figure 8:
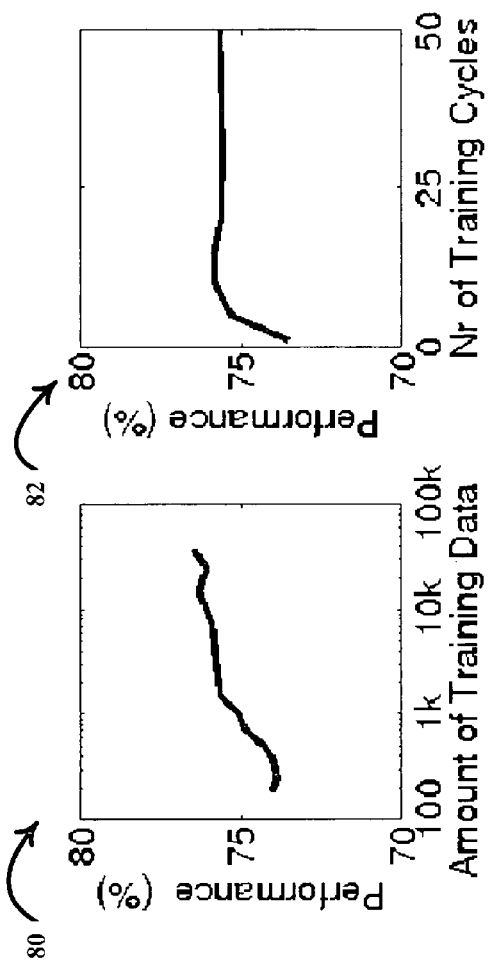
FIG. 8 graphically depicts results from effects of the unsupervised (no manual intervention) vocabulary tree training on performance. Left (80) represents performance vs training data volume in number of 720×480 frames, run with 20 training cycles. Right (82) represents performance vs number of training cycles run on 7K frames of training data.

FIG. 8 graphically depicts results from effects of the unsupervised (no manual intervention) vocabulary tree training on performance. Left (80) represents performance vs training data volume in number of 720×480 frames, run with 20 training cycles. Right (82) represents performance vs number of training cycles run on 7K frames of training data. The training defining the vocabulary tree was performed on video entirely separate from the database. The tests were run with a 6×10 vocabulary tree on the 6376 ground truth image set.

Figure 9:
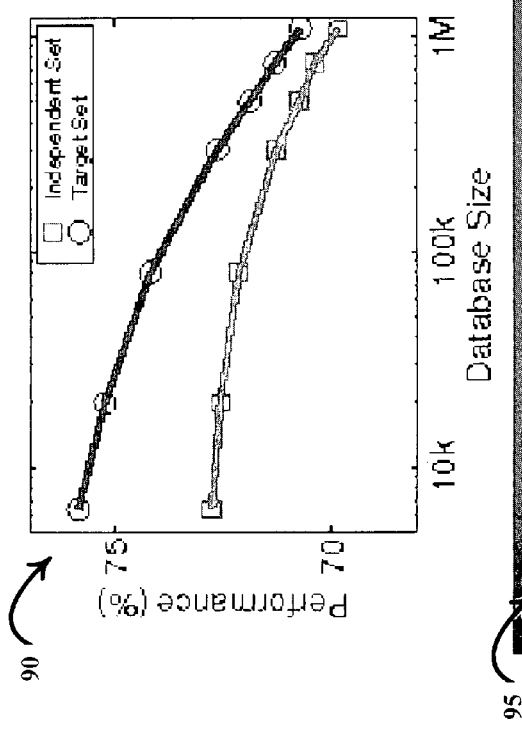
FIG. 9 graphically depicts results (two curves in graph 90) from performance with respect to increasing database size, up to 1 million images.

FIG. 9 graphically depicts results (two curves in graph 90) from performance with respect to increasing database size, up to 1 million images. The vocabulary tree tested, here, was defined with video separate from the database. Results are shown for two different ways of defining the entropy weighting of the vocabulary tree. The more interesting case is where entropy is defined with video independent of the database. For comparison, the result of using the ground truth target subset of images is also shown.

Figure 10:
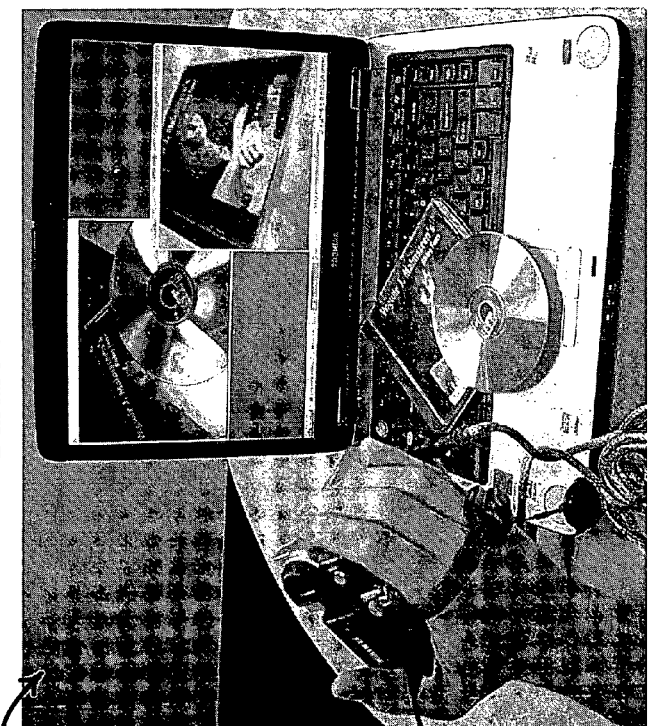
FIG. 10 is a snapshot of the CD-cover recognition running, as displayed at 95, on a laptop personal computer (PC).

FIG. 10 is a snapshot of the CD-cover recognition running, as displayed at 95, on a laptop personal computer (PC). With 40000 images in the database, the retrieval is still real-time and robust to occlusion, specularities, viewpoint, rotation and scale changes. The camera is directly connected to the laptop via firewire. The captured frames are shown on the top left, and the top of the query is displayed on the bottom right. Some of the CDcovers are also connected to music that is played upon successful recognition.

FIG. 11top depicts an image (individual digital picture) undergoing a query (120, FIG. 12). Results are from searching a one-million image database built and trained (100, FIG. 12) including all the frames of seven movies and 6376 ground truth images. Searching for a region-rich rigid object such as a CD-cover, book, building or location works quite well even for this size of database. The Coliseum in Rome search easily finds the frames from a short clip found within a popular movie, The Bourne Identity. However, searching to match a face (from someone well known, or not) is more difficult. FIG. 11bottom depicts results from searching the image of a movie star face using a database size of 300K frames. Both searches were performed with images separate from the movies.

FIG. 12 is a high-level functional diagram schematically representing use of the hierarchical quantizer, Q, as produced after training within the trainer component 100, and as applied within a novel image-insertion component 110 and novel image-query component 120.

FIG. 13 schematically represents of a vocabulary tree 130 as a hierarchy of smaller quantizers, as used during an image-query (see, also, FIG. 12 at 120). Computing the visual words, as contemplated herein, is depicted as a tree where each visual word encodes a path in the tree. The tree has depth d+1 and every node (except for the leaves) has k children. Each node has the following properties:

inverted_file records all documents which reference this node. The inverted file can be either an actual list represented in memory or in the case for non-leaf nodes or a virtual which can be obtained by concatentation of all inverted files which are descendents of the current node. Inverted files are ALWAYS assumed to be sorted.

count_total the total number of elements in the inverted file of the node.

count_unique the number of unique ids in the inverted file of the node.

entropy=−log(N_unique_this_node/N_unique_root_node) OR entropy=0 if N total_this_node>scoring-limit To query on an input query image, quantize the descriptor vectors of the input query image in a similar way, and accumulate scores for the images in the database with so called term frequency inverse document frequency (tf-idf). This is effectively an entropy weighting of the information. A match is made (see also FIG. 12 at 128) for that database image having the most-common information with the input query image.

FIG. 14 is a functional diagram schematically detailing, using pseudo code, trainer component 105, the outcome of which is a trained vocabulary tree/hierarchical vector quantizer (also represented elsewhere in FIG. 2d and at 30 in FIG. 3).

FIG. 15 is a functional diagram schematically detailing, using pseudo code and by way of schematic (see also FIG. 12 at 115, 125) the application of a trained hierarchical quantizer, Q, as employed in either the image-insert 110 or image-query 120 component.

FIG. 16 is a functional diagram schematically detailing a conventional transformation of an Image into a set of feature vectors—four of such a sets represented in FIG. 12 at 102 (Image 01, Image 02, Image 03, **Image 04)—for quantizing according to the invention.

FIG. 17 is a simplification, in flow diagram format, of the process to quantize feature vectors of an image, starting with the conventional transformation of an **Image (see also FIG. 16) into a set of feature vectors 112, 122 (see also FIG. 12), through hierarchical sorting/organization.

FIG. 18 is a simplification, in flow diagram format, of process 220 to quantize feature vectors of an image during an image-query (expansion of elements in the image-query 120, FIG. 12), starting with a conventional transformation of an **Image (see also FIG. 16) into a set of feature vectors, through hierarchical sorting/organization, etc.

Example 01

Particular Reference Made to Illustrations in FIGS. 1-13

An image recognition and retrieval process for recognition of a large number of objects, has been implemented. Initial focus was on recognizing the graphics (objects) on compact disk (CD) covers from a database of 40,000 images of popular music CD's. The vocabulary tree has been built that directly defines the quantization. The recognition quality was evaluated through image retrieval on a database (of images) with ground truth, showing the power of the vocabulary tree, going as high as 1 million images. In this implementation, feature extraction on a 640×480 video frame took ~0.2 s and the database query takes 25 ms on a database with 50000 images.

Sivic and Zisserman (2003) presented a process for retrieval of clips/shots from a movie using a text retrieval approach. Descriptors extracted from local affine invariant regions are quantized into visual words, which are defined by k-means performed on the descriptor vectors from a number of training frames. The collection of visual words are used in, what is known as, Term Frequency Inverse Document Frequency (TF-IDF) scoring of the relevance of an image to the query. Sivic and Zisserman (2003) scoring is accomplished using inverted files.

The novel hierarchical TF-IDF scoring uses hierarchically defined 'visual words' to build a novel vocabulary tree, i.e., hierarchically organized quantizer, Q, at 10, 30, applied in connection with novel image-insertion and image-query stages (respectively at 110 and 120 in FIG. 12). This allows efficient lookup (match 128, FIG. 12) of visual words, permitting use of a larger vocabulary (or database of hierarchically organized feature vectors), shown to result in a significant improvement of retrieval quality over conventional image retrieval techniques.

The instant unique process has been evaluated through retrieval on a database with ground truth consisting of known groups of images of the same object or location, but under different viewpoint, rotation, scale and lighting conditions. The novel approach of the invention permits use of a larger vocabulary which, in turn, unleashes the power of utilizing the inverted file approach (the fraction of images in the trained database that have to be considered during image-query is decreased). Surprising retrieval quality is obtained since a larger vocabulary, even as large as a vocabulary tree with 16 million leaf nodes, can be searched.

Others have suggested that utilizing certain schemes for organizing data, might present a useful way to index local image regions. In contrast, the instant novel technique utilizes proximity of descriptor vectors to various cluster centers defining the vocabulary tree. Furthermore, the novel offline (automatic/unsupervised) training resulting in the hierarchical organization of feature vectors to build, or define, the vocabulary tree, permits new images to be inserted on-the-fly into the database (FIG. 12, 110). Decision trees have been used by others to index keypoints, wherein pixel measurements are taken, and organization/indexing is aimed at splitting the descriptor distribution roughly in half (splitting the difference). Insertion of new objects requires offline use of the indexed decision tree. Distinguishable from these conventional approaches is the vocabulary tree contemplated herein which is adapted to the likely distribution of data so that a smaller tree, results in better resolution with greater speed.

For feature 14 extraction (FIGS. 1, 13, and 16) a unique implementation of Maximally Stable Extremal Region(s), MSER(s) is employed see above reference made to J. Matas, O. Chum, M. Urban, T. Pajdila, "Robust Wide Baseline Stereo from Maximally Stable Extremal Regions," In BMVC, Vol. 1, pp. 384-393 (2002). An elliptical patch is warped around each MSER region into a circular patch. The remaining portion of the instant feature extraction is then implemented according to the SIFT feature extraction pipeline by Lowe (2004), as reference above David Lowe, "Distinctive Image Features from Scale-Invariant Keypoints," IJCV 60(2): 91-110 (Jan. 5, 2004). Canonical directions are found based on an orientation histogram formed on the image gradients. SIFT descriptors are then extracted relative to the canonical directions. The normalized SIFT descriptors are then quantized utilizing the quantization tool/vocabulary tree. Finally, a hierarchical scoring scheme is applied to retrieve images from a database.

The vocabulary tree is effectively a hierarchical quantization tool built employing a hierarchical k-means clustering (see FIG. 12, 100, particularly 105), by recursively applying a k-means at each node at each level (FIG. 12, 105). A large set of representative descriptor vectors generated with information from many images are used in an 'unsupervised training' (i.e., an automatic run, without human intervention) to, first, build the tree (FIGS. 2a-2d). Instead of k defining the final number of clusters or quantization cells (as is done in conventional, individually applied k-means cluster), k defines the branch factor (number of 'children' springing from each node) of the tree. First, an initial k-means process is run on the training data, defining k cluster centers. The training data is then partitioned into k groups, where each group consists of the descriptor vectors closest to a particular cluster center. The same process is then recursively applied to each group of descriptor vectors, recursively defining quantization cells by splitting each quantization cell into k new parts. The tree is determined level by level, up to some maximum number of levels L (or d, for depth, as used in FIGS. 12 and 15), and each division into k parts is only defined by the distribution of the descriptor vectors that belong to the parent quantization cell.

In the online phase (FIG. 12, 110 or 120), each descriptor vector is propagated down the tree by at each level comparing the descriptor vector to the k candidate cluster centers (represented by k children in the tree) and choosing the closest center. This is a matter of performing k dot products at each level, resulting in a total of $k_L$ dot products, which is efficient if k is not too large. The path down the tree is encoded by an integer (numerical quantity) and is then available for use in scoring. Note that the tree directly defines the visual vocabulary and an efficient search procedure in an integrated manner. This is much different from the conventional technique that simply defines a visual vocabulary non-hierarchically, and then utilizes an approximate nearest neighbor search in order to find visual word(s) in a database.

The computational cost of applying the instant unique hierarchical approach is logarithmic in the number of leaf nodes. The memory usage is linear in the number of leaf nodes $k^L$, with the total number of descriptor vectors represented within the tree can be expressed as:

$$\sum_{i=1}^{L} k^i = \frac{k^{L+1} - k}{k - 1} \approx k^L$$

For D-dimensional descriptor vectors, the size of the tree is approximately $Dk^L$ bytes. The implementation referenced here, by way of example only, generated and employed a vocabulary tree with D=128, L=6 and k=10, resulting in 1M leaf nodes, uses 143 MB of memory.

Once the quantization tool is built/defined (FIG. 12, 100), a database image can be compared against a query image based on how similar the paths down the vocabulary tree are for the descriptor vectors from the database image and the query image: The concept of paths of a tree, within the context of an image, is depicted by FIG. 3 at 30: It depicts one of a myriad of optional hierarchical structures. The weights for the different levels of the vocabulary tree can be handled in various ways. It has been found that it is better to use the entropy relative to the root of the tree and ignore dependencies within the path. It is also possible to block some of the levels in the tree by setting their weights to zero and only use the levels closest to the leaves.

In the context of retrieval quality, preferably one would choose a large vocabulary (large number of leaf nodes), without using overly strong weights to the inner nodes of the vocabulary tree. In principle, the vocabulary size must eventually grow too large. The trade-off is distinctiveness (requiring small quantization cells and a deep vocabulary tree) versus repeatability (requiring large quantization cells). It has been found that for a large range of vocabulary sizes (up to somewhere between 1 and 16 million leaf nodes), image retrieval performance increases with the number of leaf nodes. When using inverted files, the longer lists were blocked. This can be done since symbols in very densely populated lists do not contribute much entropy. To score efficiently with large databases inverted files were used for this implementation. Every node in the vocabulary tree was associated with an inverted file. The inverted files store the id-numbers of the images in which a particular node occurs, as well as for each image term frequency $m_i$. Forward files can also be used as a complement in order to look up which visual words are present in a particular image. Only the leaf nodes are explicitly represented in our implementation, while the inverted files of inner nodes simply are the concatenation of the inverted files of the leaf nodes, see FIG. 4. The length of the inverted file is stored in each node of the vocabulary tree.

This length is essentially the document frequency with which the entropy of the node is determined. As discussed above, inverted files above a certain length are blocked from scoring.

While it might seem straightforward to implement scoring with fully expanded forward files, this is not true when scoring using inverted files. Assume that the entropy of each node is fixed and known, which can be accomplished with a pre-computation for a particular database, or by using a large representative database to determine the entropies. The vectors representing database images can then be pre-computed and normalized to unit magnitude, for example, when images are entered into the database. Similarly, the query vector is normalized to unit magnitude. The normalized difference in $L_p$-norm can be computed as follows:

$$\|q - d\|_p^p = \sum_i |q_i - d_i|^p \qquad (5)$$

$$= \sum_{i|d_i=0} |q_i|^p + \sum_{i|q_i=0} |d_i|^p + \sum_{i|q_i \neq 0, d_i \neq 0} |q_i - d_i|^p$$

$$= \|q\|_p^p + \|d\|_p^p + \sum_{i|q_i \neq 0, d_i \neq 0} (|q_i - d_i|^p - |q_i|^p - |d_i|^p)$$

$$= 2 + \sum_{i|q_i \neq 0, d_i \neq 0} (|q_i - d_i|^p - |q_i|^p - |d_i|^p),$$

which can be partitioned since the scalar product is linear in $d_i$. For other norms, the situation is more complicated. One prefered option is to first compose $d_i$, which can be done by for each database image remembering which node i was last touched, and the amount of $d_i$ accumulated so far. The accumulated $d_i$ is then used in Equation 5 (above).

The technique was tested by performing queries on a database either consisting entirely of, or containing a subset of images with known relation. The image set with ground truth contains 6376 images in groups of four that belong together, see FIG. 5 for examples. The database is queried with every image in the test set and our quality measures are based on how the other three images in the block perform. Use the geometry of the matched keypoints in a post-verification step of the top n candidates from the initial query. This will improve the retrieval quality. However, when considering really large scale databases, such as 2 billion images, a post-verification step would have to access the top n images from n random places on disk. With disk seek times of around 10 ms, this can only be done for around 100 images per second and disk. Thus, the initial query has to more or less put the right images at the top of the query.

FIG. 6 shows image retrieval results for a large number of settings with a 1400 image subset of the test images. The curves 60 show the distribution of how far the wanted images drop in the query rankings. The use of a larger vocabulary and also $L_1$-norm gives performance improvements over the settings used by others. The performance with various settings was also tested on the full 6376 image database. The effect of the shape of the vocabulary tree is shown in FIG. 7. The effects of defining the vocabulary tree with varying amounts of data and training cycles are investigated in FIG. 8. FIG. 10 is a snapshot of a demonstration of the method, running real-time on a 40000 image database of CD covers. A database size of 1 million images has been built: This is more than one order of magnitude larger than employing any other technique of this type. The results are shown in FIG. 9: The 6376 image ground truth set was embedded in a database that also contains several popular movies: The Bourne Identity, The Matrix, Braveheart, Collateral, Resident Evil, Almost Famous and Monsters Inc. Here, all frames from the movies were used to generate the database, each as a separate image unrelated to the rest. The image queries were run in RAM on a 8 GB machine and take about 1 s each. Database creation (mainly feature extraction) took ~2½ days. Two search results with still images are shown in FIG. 11.

Example Implementation

Expansion

Additional subcomponents (see FIG. 18) expanding those shown in FIGS. 1-18 are described below with pseudo-code, each section applying to the process, tasks titled as follows:
TASK: Document insertion.

Given a document with n visual words in a vector w we insert to the database by adding the id of the document to every stored inverted file mentioned in w with the same multiplicity.

We also add the total number going under each node in the tree to the count_total counter and +1 to the count_unique of all these nodes.

There is a vector if weighs which is dependent on both the documents and the entropies, for correctness it is re-computed whenever the entropies change, that is, whenever a document is inserted.

```
-----
TASK: Assign scores from a single inverted file associated with a visual word w.
Input: qweight: weight modifier of the query document multiplied with the multiplicity of the word w.
       invfile : inverted file associated with the visual word w, can be a virtual list (but is still
assumed to be sorted).
       entropy : entropy of the visual word
       scores : vector to which to add scores to
       weigths : the weight modifiers of all docs p currently used norm
Output : by modifying scores
function assign_scores(invfile,qcount,qweight,entropy,scores,weights)
j=1
while( j <= invfile.length )
       fcount =1
       doc = invfile[j]
       while( (j<invfile.length) and (doc == invfile[j+1]))
          fcount ++
          j++
       end
       fq = entropy*q_weight
       fd = entropy*fcount*weights[doc]
       scores[doc] += abs(fq-fd)^p - abs(fq)^p - abs(fd)^p
end
-----
TASK: Queryprogram.
    Input : Vector of intergers w with length n
            p the norm to use. Usually 1 for 1-norm
            N index of highest id in the database
            weights the vector of weights for the documents
    Output: Scores
q_weight = compute_weight( w )
for i=0 to N
    scores[i] = 2
end
expand w to a list of nodes with multiplicities, we assume that these nodes know the internal variables
of the database tree of nodes.
for each node
       if( node.total_count < scoring_limit)
          assign_scores(node.invfile,node.multiplicity*qweight,node.entropy,scores,weights,p)
return scores
-----
TASK: Query Pipeline.
    Static Information:    Database with inverted files
                           Quantizer
                           Entropy for all visual words
                           Weights for the inverted files
    Input:                 Image
                           Wanted number of top matches n
    Output:                Vector of indices to best n scores
                           Vector of corresponding scores
1) Extract features
2) Compute integer vector representation of the image
3) Perform query
4) Find the top n entries in the score vector
5) Return corresponding indices and scores
-----
TASK: Update counts, heirarchical, unique occuerences are counted.
Input
       counts_unique, is double indexed, is modified
       counts_total, is double indexed, is modified
       w sorted vector of visual words
       n length of w
       k tree shape parameter
       d tree depth
```

```
function update_counts( w, n, k, d, counts_unique, counts_total)
for current_depth 0 to d
    m = k^(d-current_depth)
    prev = -1
    for i=1 to n
        curr = floor( w[i] / m)
        it( curr != prev )
            counts_unique[current_depth][curr] ++
        counts_total[current_depth][curr] ++
        prev = curr
    end
end
-----
TASK: Compute entropy.
    Input: counts_unique
            d, k
    output: entropy
entropy = compute_entropy( counts_unique, d,k)
N = count_unique[0][0]
for current_depth=1 to d
    for i = 1 to k^current_depth
        entropy[current_depth][i] = -log( counts_unique[current_depth][i]/N)
    end
end
-----
TASK: Compute weight, the below function is iterated over all documents to get all weights.
weights = compute_weights( w,n,count_total,k,d , p , scoring_limit )
weight= 0;
for current_level = 0 to d
    i=1
    m = k^(d-current_level)
    while( i <= n)
        currpos = floor( w[i] /m )
        qcount = count_multiplicity(i,n,w,m)
        if( total_count[current_level][currpos] < scoring_limit)
            weight += (qcount*entropy[current_level])^p
        i+= qcount
    end
end
return weight^(-1/p)
-----
TASK: Hierarchical Query.
function query(w,n,entropy, total_count, weights, scoring_limit, inverted_files)
for i=1 to N
    scores[i] = 0
end
for d=0 to total_depth
    m = k^(total_depth-d)
    perform_level_query(    w,n,m,scores,    inverted_files,    entropy[d],    total_count[d],
scoring_limit,weights)
end
return scores
-----
TASK: Level Query.
    Input
        scores, will be modified
        weights
        scoring_limit
        entropy
        total_count
        w
        n
        m
        inverted files
function query_level(w,n,m,scores, weights, scoring_limit, entropy, total_count, inverted_files )
i=1
while( i <= n)
    qcount = count_multiplicity( w,n,m,i)
    if( count_total[w[i]] < scoring_limit )
        for i=0 to (m-1)
            score_infvile( inverted_files[ node*m+i],qcount, entropy, weights, scores)
        end
        i+= qcount
end
-----
TASK: Find cell.
    Input: A k-means clusterer Q trained on dimension L with k centers
            A vector of length L
best = -1
```

```
-continued bestscore = inf
for i=0 to (k-1)
    score = 2-norm( x-center_i)
    if( score < bestscore)
      best = i
      bestscore = score
    end
end
return best
-----
TASK: Count multiplicity.
Input i current position in w
      n length of w
      w vector of visual words
      m integers telling what division is used
output qcount multiplicity of the current visual word
function qcount = count_multiplicity(i,n,w,m)
qcount = 1;
    while( (i<n) and (floor(w[i]/m)==floor(w[i+qcount]/m)))
      qcount ++
    end
return qcount
-----
```

While certain representative embodiments and details have been shown for the purpose of illustrating features of the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke 35 U.S.C. §112 ¶6 in a manner that unduly limits rights to its innovation. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A computerized image retrieval system having a processor adapted for implementing a quantization tool, the tool comprising:
    hierarchically quantized data representing a plurality of images organized using a method comprising the steps of:
    (a) employing the processor for computing a plurality of sets of feature vector information, each set associated with a particular image wherein each said feature vector information within the set represents a detected feature region of interest from said particular image;
    (b) quantizing each said feature vector information of each of the sets, producing a list of numerical quantities associated with each of the sets; and
    (c) applying a k-means cluster operation, recursively, splitting each of said lists into a plurality of branched parts, hierarchically organizing the sets of feature vector information into said parts to which said cluster operation is subsequently, likewise, applied.

2. A database generated using the quantization tool of claim 1, the database comprising the hierarchically organized sets of feature vector information representing the plurality of images.

3. The database of claim 2 to which new data representing a new image is inserted using a process for inserting comprising the steps of:
    (a) first employing the processor for computing a new image set of feature vector information for the new image; and
    (b) quantizing each of said feature vector information for the new image to create a new image list of numerical quantities associated with the new image.

4. The database of claim 2 against which query data representing a query image is compared using a process for finding a closest match comprising the steps of:
    (a) first, employing the processor for computing a query image set of feature vector information for the query image; and
    (b) quantizing each of said feature vector information for the query image to create a query image list of numerical quantities associated with the query image, to find a closest match within the database.

5. The quantization tool of claim 1 used in a process for inserting new data representing a new image into a database generated using the quantization tool, the process for inserting comprising the steps of
    (a) first employing the processor for computing a new image set of feature vector information for the new image; and
    (b) quantizing each of said feature vector information for the new image to create a new image list of numerical quantities associated with the new image.

6. The quantization tool of claim 1 used in a process for performing an image-query with a query image against a database generated using the quantization tool, the process for performing an image-query comprising the steps of:
    (a) first employing the processor for computing a query image set of feature vector information for the query image; and
    (b) quantizing each of said feature vector information for the query image to create a query image list of numerical quantities associated with the query image, to find a closest match within the database.

7. A computerized image retrieval system having a processor adapted for implementing a quantization tool for use in generating a database comprising hierarchically organized sets of feature vector information representing a plurality of images, the sets of feature vector information having been organized using a method comprising the steps of:
(a) employing the processor for computing a plurality of sets of feature vector information each set associated with a particular image wherein each said feature vector information within the set represents a detected feature region of interest from said particular image;
(b) quantizing each said feature vector information of each of the sets, producing a list of numerical quantities associated with each of the sets; and
(c) applying a k-means cluster operation, recursively, splitting each of said lists into a plurality if branched parts, hierarchically organizing the sets of feature vector information into said parts to which said cluster operation is subsequently, likewise, applied.

8. A database generated using the quantization tool of claim 7 to which new data representing a new image is inserted using a process for inserting comprising the steps of:
(a) first, employing the processor for computing a new image set of feature vector information for the new image; and
(b) quantizing each of said feature vector information for the new image to create a new image list of numerical quantities associated with the new image.

9. The quantization tool of claim 7 used in a process for performing an image-query with a query image against the database generated using the quantization tool, the process for performing an image-query comprising the steps of:
(a) first employing the processor for computing a query image set of feature vector information for the query image; and
(b) quantizing each of said feature vector information for the query image to create a query image list of numerical quantities associated with the query image, to find a closest match within the database.

10. A computer executable program code on a computer readable storage medium for hierarchically quantizing data representing a plurality of images, the program code comprising:
(a) a first program sub-code for computing a plurality of sets of feature vector information, each set associated with a particular image wherein each said feature vector information within the set represents a detected feature region of interest from said particular image;
(b) a second program sub-code for quantizing each said feature vector information of each of the sets, producing a list of numerical quantities associated with each of the sets; and
(c) a third program sub-code for applying a k-means cluster operation, recursively, splitting each of said lists into a plurality of branched parts, hierarchically organizing, the sets of feature vector information into said parts to which said cluster operation is subsequently, likewise, applied.

11. The program code of claim 10 wherein a database is generated comprising the hierarchically organized sets of feature vector information representing the plurality of images.

12. A computer executable program code on a computer readable storage medium for use in generating a database comprising hierarchically organized sets of feature vector information representing a plurality of images, the program code comprising:
(a) a first program sub-code for computing a plurality of sets of feature vector information, each set associated with a particular image wherein each said feature vector information within the set represents a detected feature region of interest from said particular image;
(b) a second program sub-code for quantizing each said feature vector information of each of the sets, producing a list of numerical quantities associated with each of the sets; and
(c) a third program sub-code for applying a k-means cluster operation, recursively, splitting each of said lists into a plurality of branched parts, hierarchically organizing the sets of feature vector information into said parts to which said cluster operation is subsequently, likewise, applied.

13. The program code of claim 12 further comprising:
(a) a fourth program sub-code for computing a new image set of feature vector information for a new image to be inserted into the database; and
(b) a fifth program sub-code for quantizing cacti of said feature vector information for the new image to create a new image list of numerical quantities associated with the new image.

14. The program code of claim 12 further comprising:
(a) a fourth program sub-code for computing a query image set of feature vector information for a query image to be queried against the database; and
(b) a fifth program sub-code for quantizing each of said feature vector information for the query image to create a query image list of numerical quantities associated with the query image, to find a closest match within the database.

15. The program code of claim 10 further comprising a fourth program sub-code for inserting new data representing a new image into a database generated using quantization tool, the fourth program sub-code for inserting comprising:
(a) first instructions for computing a new image set of feature vector information for the new image; and
(b) second instructions for quantizing each of said feature vector information for the new image to create a new image list of numerical quantities associated with the new image.

16. The program code of claim 10 further comprising a fourth program sub-code for performing an image-query with a query image against a database generated using the quantization tool, the fourth program sub-code for performing an image-query comprising:
(a) first instructions for computing a query image set of feature vector information for the query image; and
(b) second instructions for quantizing each of said feature vector information for the query image to create a query image list of numerical quantities associated with the query image, to find a closest match within the database.

* * * * *